United States Patent [19]
Fujii et al.

[11] Patent Number: 5,279,476
[45] Date of Patent: Jan. 18, 1994

[54] TAPE CASSETTE LID HAVING PROJECTION FOR PREVENTING TAPE PINCHING

[75] Inventors: Hiroshi Fujii, Tokyo; Tomihiro Nakagawa, Kanagawa, both of Japan

[73] Assignee: Sony Corporation, Tokyo, Japan

[21] Appl. No.: 837,905

[22] Filed: Feb. 20, 1992

[30] Foreign Application Priority Data

Feb. 25, 1991 [JP] Japan .................... 3-050222

[51] Int. Cl.$^5$ ............................. G11B 23/04
[52] U.S. Cl. ........................... 242/199; 360/132
[58] Field of Search ............ 242/199, 200, 198; 360/132

[56] References Cited

U.S. PATENT DOCUMENTS 4,858,848  8/1989  Katoku et al. ............. 242/199 X

FOREIGN PATENT DOCUMENTS

| | | |
|---|---|---|
| 540710 | 11/1984 | Australia . |
| 0169544 | 1/1986 | European Pat. Off. ............ 360/132 |
| 0289411 | 11/1988 | European Pat. Off. . |
| 0389279 | 9/1990 | European Pat. Off. . |
| 0400933 | 12/1990 | European Pat. Off. . |
| 2176170 | 12/1986 | United Kingdom . |

*Primary Examiner*—John M. Jillions
*Assistant Examiner*—John Rollins
*Attorney, Agent, or Firm*—William S. Frommer; Alvin Sinderbrand

[57] ABSTRACT

A tape cassette including a rib projecting upwardly from a bottom wall of a cassette case at a position between the center and one side of a tape drawing recess formed at the front of the cassette case, the rib being disposed close to the back surface of the tape, and a projection that projects from a back lid which, in a closed position, protects the back surface of the tape. When the back lid is rotated to reach an open position, the projection is kept in contact with an upper end of the rib. Accordingly, even when a part of the tape is lifted by the back lid during a lid opening operation, the tape is prevented from entering behind the rib, thereby also preventing tape jamming and damage to the tape player.

10 Claims, 12 Drawing Sheets

TAPE CASSETTE LID HAVING PROJECTION FOR PREVENTING TAPE PINCHING

BACKGROUND OF THE INVENTION

The present invention relates to a novel tape cassette, and more particularly to a novel tape cassette which arranged to prevent slack in the tape and to prevent tape jams that max cause damage to the tape and the tape player.

A known type of tape cassette is formed with a tape drawing recess for receiving a tape loading member which draws the tape to a front surface of the cassette case.

If such a tape drawing recess is large, that is, if it extends a long distance in a lateral direction of the cassette case, there the tape disposed along the front of the tape drawing recess max become unstable.

To prevent the tape from becoming unstable, the tape cassette is provided with conventional means for locking the tape reels while the tape cassette is not being used. However, upon loading the tape cassette into a tape player, it is necessary to unlock the tape reels to allow the tape to be drawn out of the cassette case. If there is even a slight error in the timing for unlocking the tape reels unlocking, slack may be formed in the tape leading to a tape jam.

To solve this problem, it has been proposed to form a tape slack preventing member c as shown in FIG. 11. In particular, the tape slack preventing member c projects upwardly from a bottom wall of a cassette case a, and is located close to a back surface of a tape b. Accordingly, even when slack is formed in the tape b, it is possible to prevent the tape b from entering a tape drawing recess d.

A known type of tape cassette, for example, the so-called 8 mm VCR tape cassette, has a front lid e rotatably supported at a front end portion of the cassette case a for covering a front surface of the tape b and a back lid f adapted to be rotated in association with rotation of the front lid e for covering a back surface of the tape b, so as to prevent dust from sticking to the part of the tape b that is outside of the cassette case a at a time when the tape cassette is not being used. However, when both the lids e and f are open it is possible for the tape b to be displaced from its proper position.

More specifically, FIG. 11 shows a closed position in which the front and back surfaces of the tape b are covered with the lids e and f, respectively, and FIG. 12 shows an open position that results after the lids e and f are rotated together to uncover the front and back surfaces of the tape b. During the movement of the back lid f between the closed position and the open position, the attitude of the back lid f is controlled according a locus of a pivot g supported by the front lid e and a locus of a slide pin i which is guided by a guide groove h formed in the cassette case a, so that the back lid f does not contact the tape b during the movement. The locus of the slide pin i is denoted by a phantom line k.

However, as the back lid f is moved in a limited space, it is unavoidable that the back lid f comes close to the tape b. Accordingly, if the back lid f was previously charged with static electricity, a part of the tape b is lifted by the back lid f during the movement to the open position. As shown in FIG. 12, there is defined a gap j between a lower end of the back lid f and an upper end of the tape slack preventing member c when the back lid f is in the open position. As a result, the part of the tape b lifted by the back lid f may pass through the gap j and enter behind the tape slack preventing member c.

When the part of the tape b goes behind the tape slack preventing member c as mentioned above, tape jamming or damage to the tape loading member or other mechanisms occurs upon tape loading.

SUMMARY OF THE INVENTION

It is accordingly an object of the present invention to provide a tape cassette which prevents slack in the tape and also prevents undesired displacement of the tape which damages the tape and the tape player.

According to the present invention, there is provided a tape cassette having a housing of generally rectangular configuration containing reels on which a supply of tape is wound and having top and bottom walls and a peripheral wall extending between the top and bottom walls along three sides of the housing so as to form an opening along the fourth side of the housing, the top and bottom walls respectively having first and second cutouts communicating with the opening and extending along a portion of said fourth side of the housing, the tape being guided between the reels in a path having a run extending along the opening, a front lid mounted on the housing and being movable relative thereto between a closed position covering the opening and an open position exposing the opening, and a back lid movable in connection with the movement of the front lid between the closed position in which the back lid is positioned behind the front lid and the open position in which the back lid is away from the back side of the tape; said tape cassette comprising a rib extending upwardly from the bottom wall behind the run of the tape along the opening, and a projection formed on the edge of the back lid, the projection confronting the rib so that the top edge of the rib engages the tip of the projection when the front lid is in the open position to prevent the tape from being displaced from the desired path.

As described above, the projection is formed on the back lid, so that when the back lid is in the open position, the projection is disposed substantially in contact with the upper end of the rib, with no gap between the rib the projection. Accordingly, even when a part of the tape is lifted by the back lid during the lid opening operation, there is no possibility of the tape going behind the rib, thus preventing tape jamming and damage to a tape player.

Other objects and features of the invention will be more fully understood from the following detailed description and appended claims when considered with the accompanying drawings.

DETAILED DESCRIPTION OF THE PREFERRED EMBODIMENT

There will now be described a preferred embodiment of the tape cassette according to the present invention with reference to the attached drawings.

The preferred embodiment shown is applied to a tape cassette for recording a high-definition (HD) television signal (which will be hereinafter referred to as an HD tape cassette). The HD tape cassette in this preferred embodiment has an external form like that of a so-called VHS tape cassette.

Figure 2:
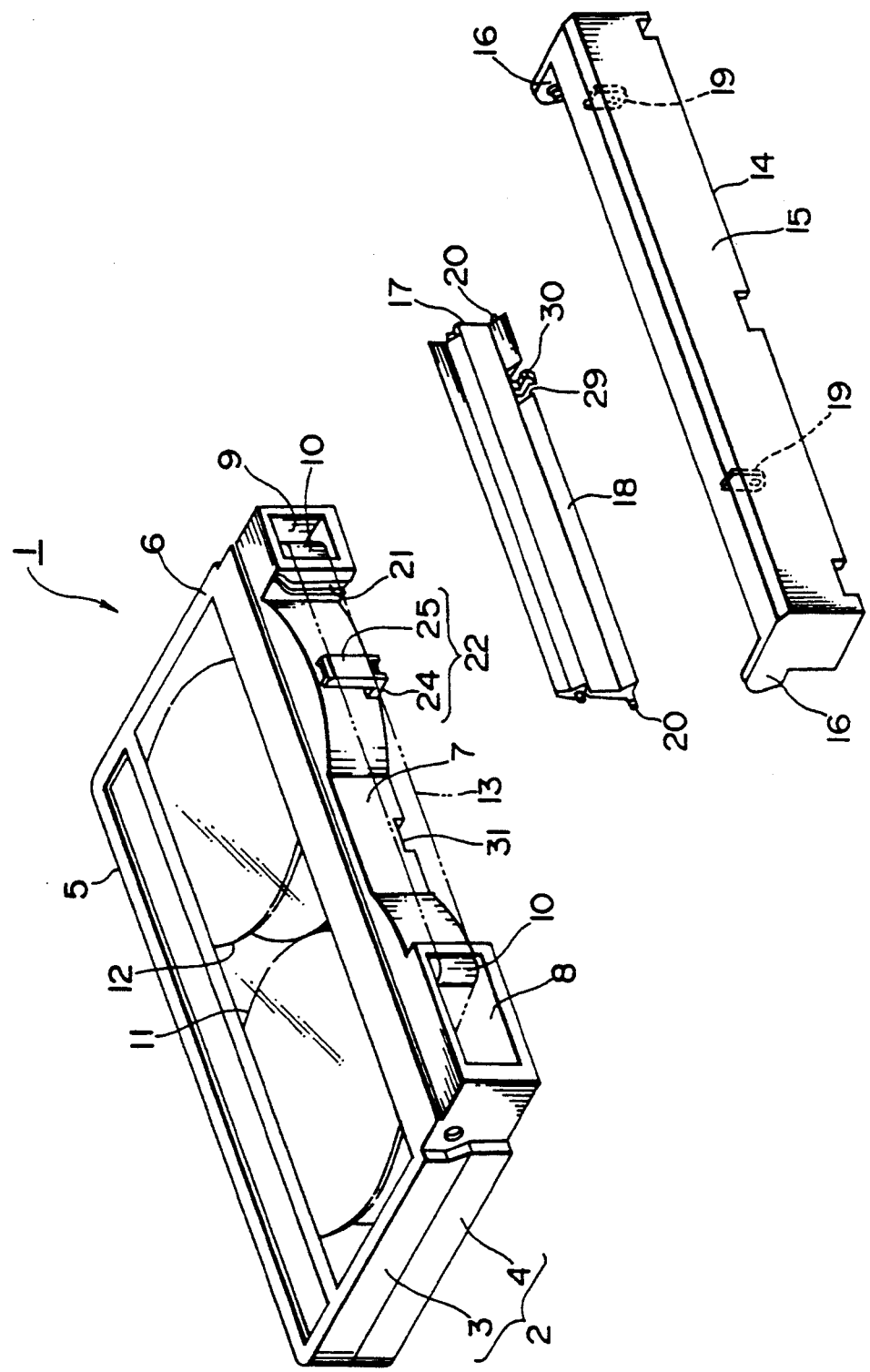
FIG. 2 is an exploded perspective view of the tape cassette.
Figure 3:
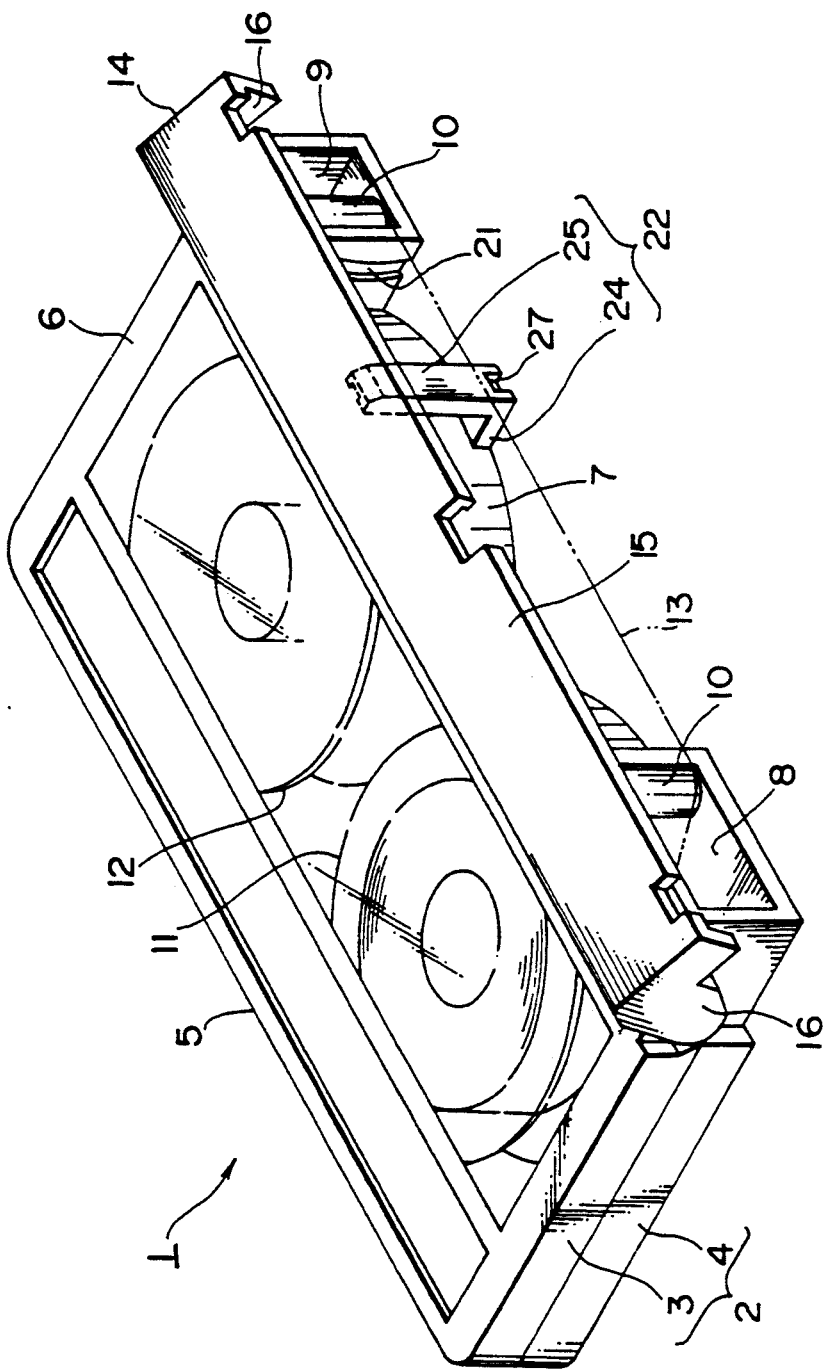
FIG. 3 is a perspective view of the tape cassette in the open position.
Figure 10:
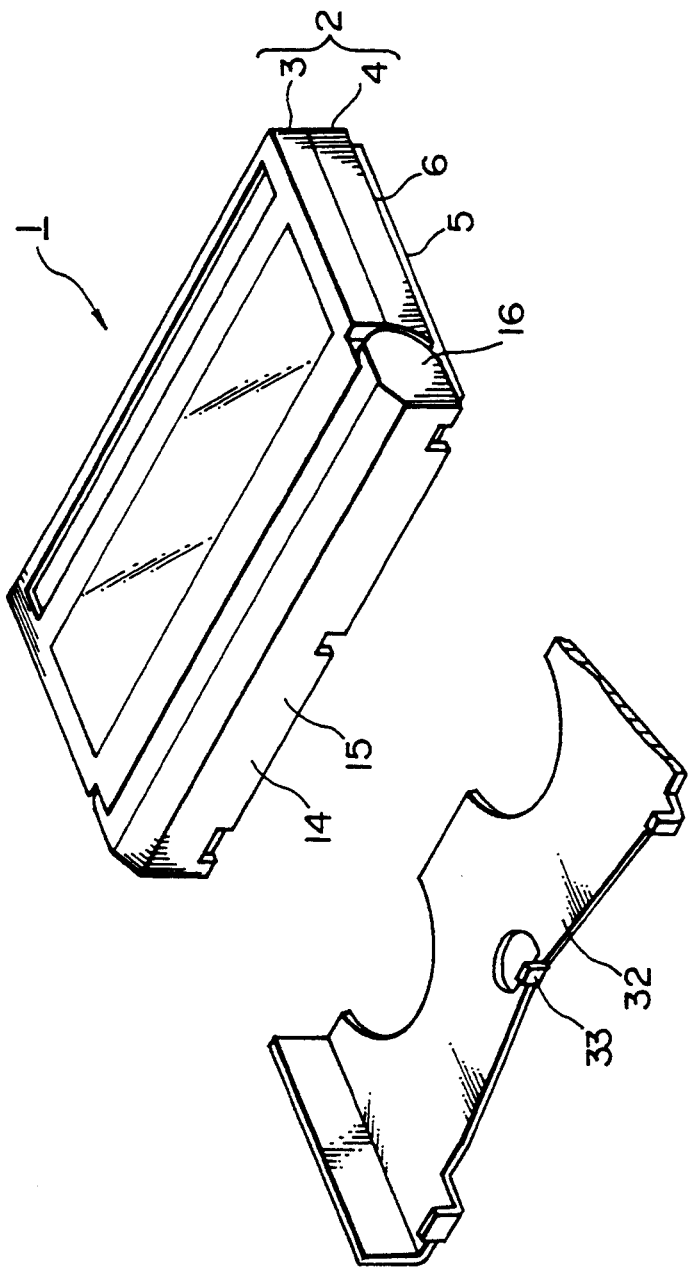
FIG. 10 is a schematic perspective view of a cassette holder.
Figure 11:
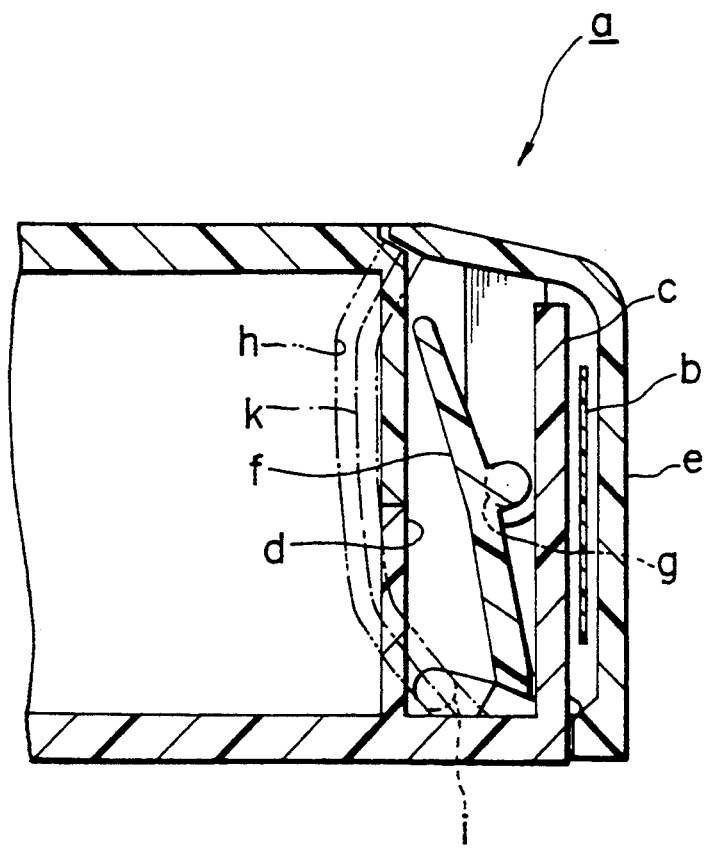
FIG. 11 is an enlarged sectional view of an essential part of a conventional tape cassette in the closed position.
Figure 12:
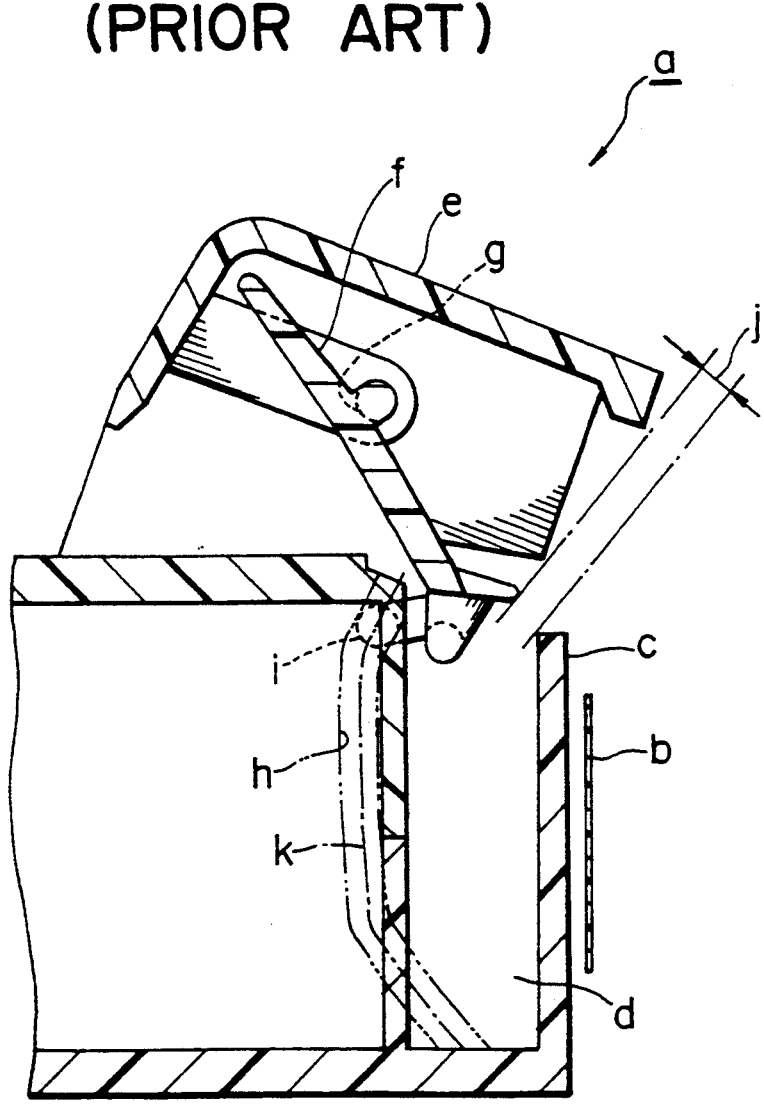
FIG. 12 is an enlarged sectional view of the essential part shown in FIG. 11 in the open position.

Referring to FIGS. 2, 3 and 10, reference numeral 1 designates the HD tape cassette, and 2 designates a cassette case of the HD tape cassette 1.

The cassette case 2 is constructed of an upper half 3 and a lower half 4 connected together to have a rectangular thin box-like configuration.

The cassette case 2 includes a main portion 5 having almost the same external form and dimensions (length, width and thickness) as that of the cassette case of the VHS tape cassette. An additional portion 6 projects from a right side of the main portion 5. The basis of the present invention is disclosed in U.S. patent application Ser. No. 748,520 filed Aug. 22, 1991.

The additional portion 6 has a width in the front and rear direction equal to that of the main portion 5, a very small width in the right and left direction, e.g., about 3% of that of the main portion 5, and a thickness that is slightly lesser than that of the main portion 5, e.g., about 90% or less of that of the main portion 5. An upper surface of the additional portion 6 is flush with an upper surface of the main portion 5. Accordingly, a lower surface 6a of the additional portion 6 is slightly higher than a lower surface 5a of the main portion 5. That is, there is defined a shallow elongated recess extending between a front end and a rear end of the right edge of the lower surface of the cassette case 2.

The internal space of the main portion 5 communicates without barriers with the internal space of the additional portion 6.

The cassette case 2 is formed so that its front surface includes a tape drawing recess 7 elongated in the right and left direction. Upon loading the tape cassette 1 into a tape player, a member for drawing a magnetic tape 13 out of the cassette case 2 and a capstan are inserted into the tape drawing recess 7.

A right portion of the tape drawing recess 7 is elongated somewhat more than a left portion thereof. This makes it possible to provide a tape player that is able to use both the VHS tape cassette and the HD tape cassette. That is, when the cassette case 2 of the HD tape cassette 1 is superimposed on the cassette case of the VHS tape cassette with the respective left side surfaces, a plurality of independent recesses provided in the VHS tape cassette for inserting the tape drawing member and the capstan are all included in the area defined by the tape drawing recess 7 of the cassette case 2.

A portion of the front surface of the cassette case 2 on the right and left sides of the tape drawing recess 7 is open to form tape outlets 8 and 9.

Reference numerals 10 designate a pair of tape guides vertically formed in the tape outlets 8 and 9 at their inner ends at the sides of the tape drawing recess 7.

A pair of tape reels 11 and 12 are rotatably accommodated in the cassette case 2, and opposite end portions of the magnetic tape 13 are wrapped around the tape reels 11 and 12. The magnetic tape 13 is partially led out of the cassette case 2 from the tape outlets 8 and 9. When, as is shown in the drawings, the magnetic tape 13 has not been drawn out for loading by a tape drawing member, portion of the magnetic tape 13 that is not inside the cassette case 2 is stretched in front of the tape drawing recess 7 and is guided at its opposite ends by the two tape guides 10.

Reference numeral 14 designates a front lid for opening and closing the front surface of the cassette case 2. The front lid 14 is integrally formed with a cover portion 15 having a substantially inverted L-shape in vertical cross section and with a pair of side portions 16 projecting rearwardly from the right and left sides of the cover portion 15. The side portions 16 of the front lid 14 are rotatably supported at respective positions near the rear ends thereof on the right and left side surfaces of the cassette case 2 at two positions near the front ends thereof. Accordingly, the front lid 14 can be moved between a closed position shown in FIGS. 4 and 5 in which a front surface of the magnetic tape 13 stretched along the front surface of the cassette case 2 is covered and an open position shown in FIGS. 6 and 7 in which the cover portion 15 has been displaced upwardly to uncover the front surface of the cassette case 2.

Reference numeral 17 designates a back lid having a substantially thin plate-like shape. The back lid 17 has a length slightly smaller than the length of the tape drawing recess 7 of the cassette case 2. The back lid 17 is formed at its lower end with a which projects portion 18 projecting frontwardly and is inclined downwardly.

The back lid 17 is rotatably supported at opposite side positions near its upper ends on a pair of supporting portions 19 formed on the cover portion 15 of the front lid 14. Further, a pair of pins 20 project sidewardly from the lower ends of the right and left sides of the back lid 17, and a pair of guide grooves 21 are formed on the right and left inner wall surfaces of the tape drawing recess 7 of the cassette case 2. The right and left pins 20 of the back lid 17 are slidably engaged with the right and left guide grooves 21 of the cassette case 2, respectively.

Figure 4:
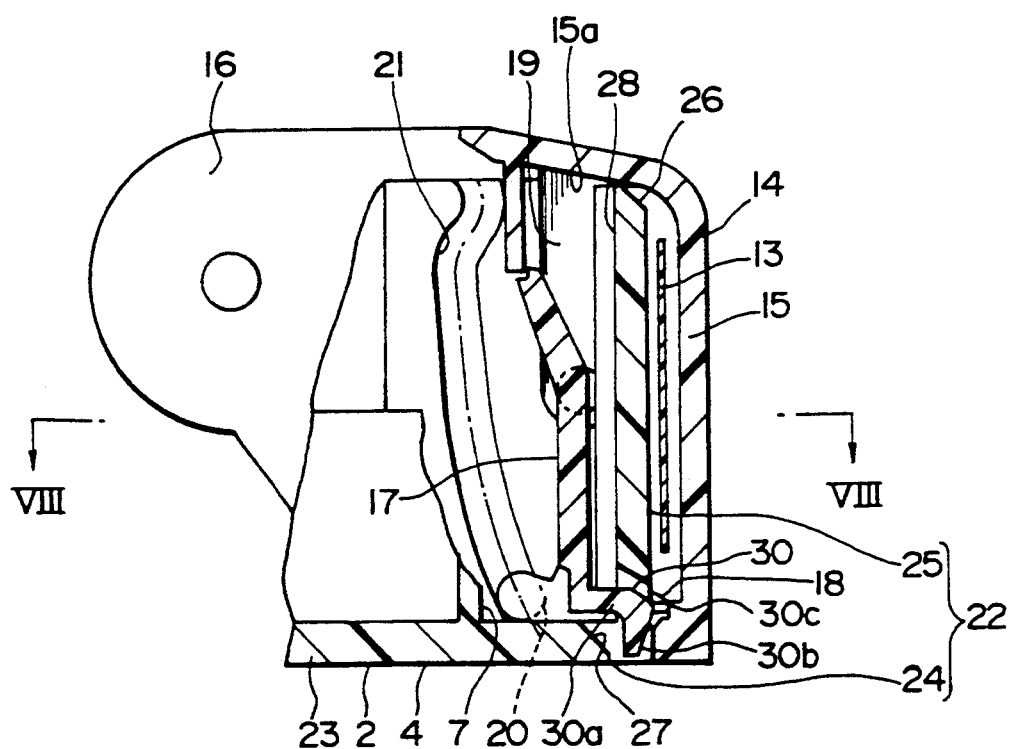
FIG. 4 is an enlarged sectional view of the essential part of the tape cassette in the closed position.
Figure 5:
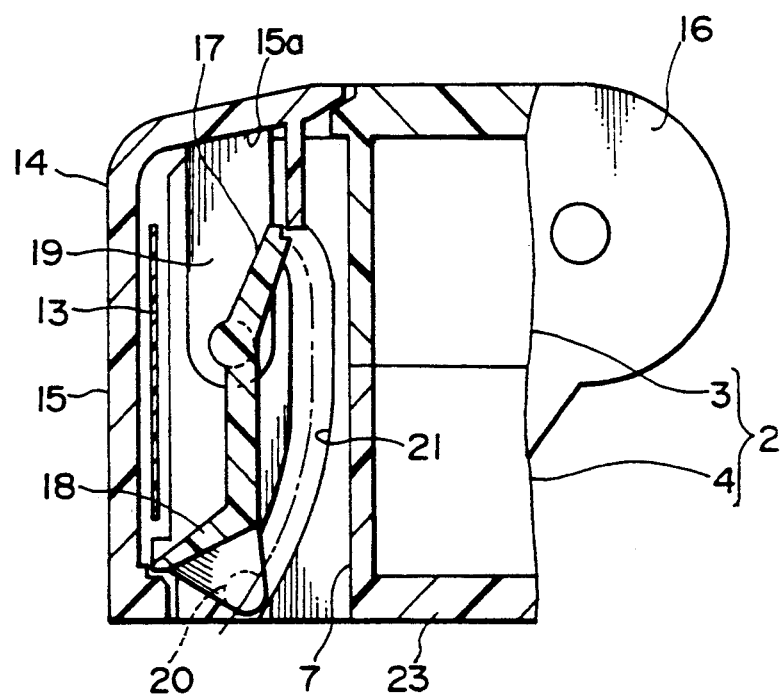
FIG. 5 is an enlarged sectional view of another essential part of the tape cassette in the closed position.
Figure 6:
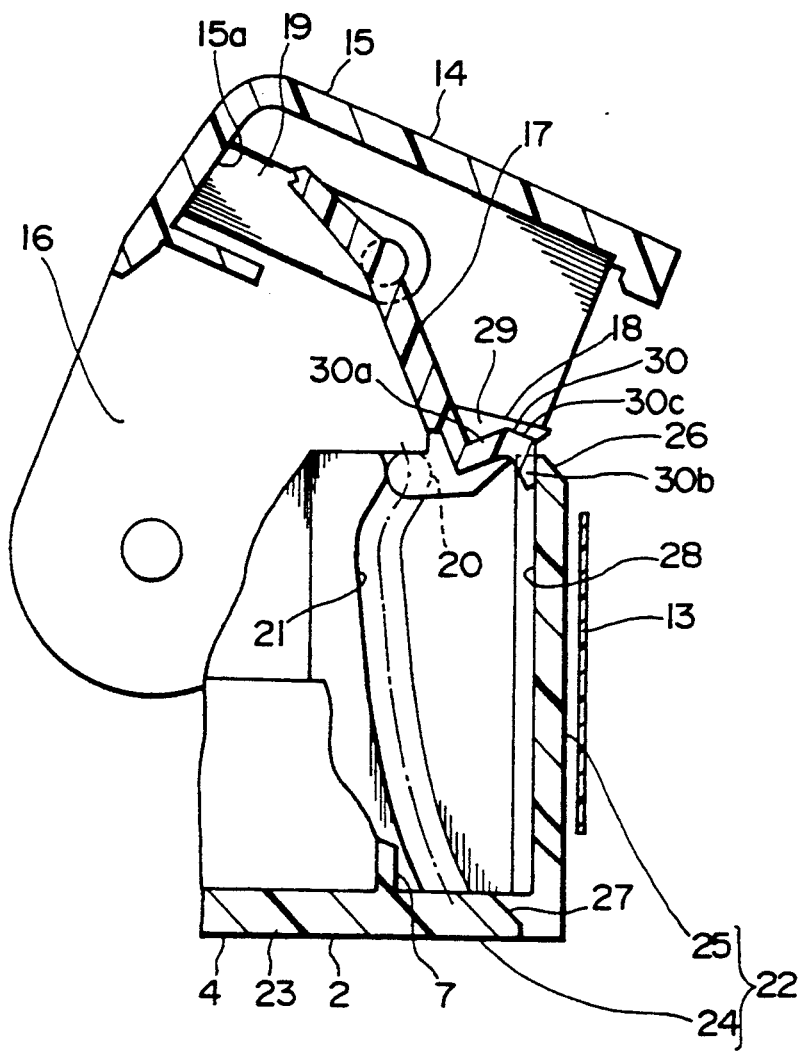
FIG. 6 is an enlarged sectional view of the essential part shown in FIG. 4 in the open position.
Figure 7:
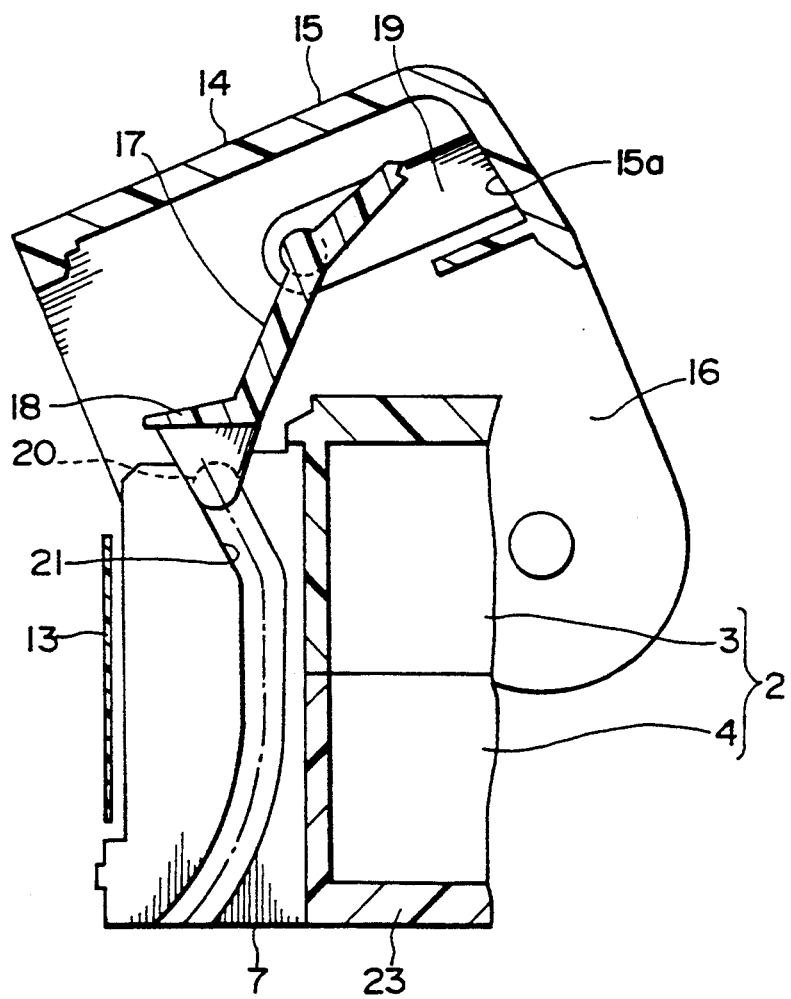
FIG. 7 is an enlarged sectional view of the essential part shown in FIG. 5 in the open position.
Figure 8:
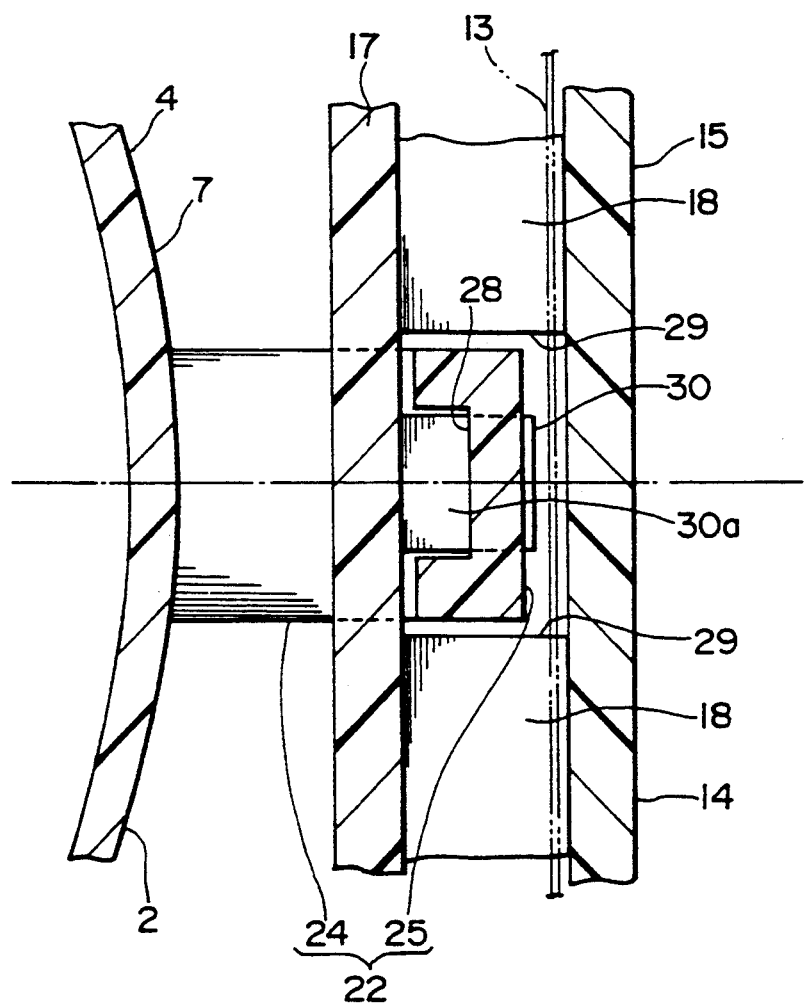
FIG. 8 is an enlarged cross section taken along the line VIII—VIII in FIG. 4.

In the closed position of the front lid 14, the back lid 17 is in a closed position in which a primary portion thereof covers a back surface of the magnetic tape 13 and a front end of the projecting portion 18 contacts a lower end portion of a back surface of the cover portion 15 of the front lid 14 to cover a lower side of the magnetic tape 13 as shown in FIGS. 4 and 5. In the open position of the front lid 14, the back lid 17 is in an open position in which it is located above the front end portion of the cassette case 2 as shown in FIGS. 6 and 7. During movement of the back lid 17 between the closed position and the open position, the attitude of the back lid 17 is controlled by the position of the portion supported by the front lid 14 and the position of the pins 20 moving along the guide grooves 21.

Reference numeral 22 designates a tape slack preventing member projecting from the lower cassette case half 4 at a substantially intermediate position between the center and the right end of the tape drawing recess 7. The tape slack preventing member 22 consists of a base portion 24 projecting frontwardly from a bottom wall 23 of the lower half 4 and a rib 25 projecting upwardly from a front end of the base portion 24.

The rib 25 is located between the front lid 14 and the back lid 17 when the same are in the closed position, and closer to the back lid 17. An upper end of the rib 25 extends to a position substantially contacting an inner surface of an upper portion 15a of the cover portion 15 of the front lid 14 in the closed position. An upper end surface of the rib 25 is formed at its front end with a surface 26 which is inclined forwardly and downwardly.

Reference numeral 27 (FIG. 1) designates an escape hole formed at a connecting portion between the base portion 24 and the rib 25 of the tape slack preventing member 22.

A back surface of the rib 25 is formed with a slide groove 28 extending from the lower end to the upper end of the rib 25.

The projecting portion 18 of the back lid 17 is formed with an escape recess 29 so that the projecting portion 18 does not interfere with the rib 25 during the rotation of the back lid 17.

A projection 30 is located in the escape recess 29 so as to project from the bottom of the recess 29 at a substantially central position thereof. The projection 30 consists of a horizontal portion 30a projecting frontwardly from the lower end of the primary portion of the back lid 17 and a vertical portion 30b projecting downwardly from a front end of the horizontal portion 30a. An outer surface of a connecting portion between the horizontal portion 30a and the vertical portion 30b is formed as an inclined surface 30c that is inclined at an angle of about 45 degrees.

In the closed position (FIG. 4), the vertical portion 30b of the projection 30 is located in the escape hole 27 of the tape slack preventing member 22. During the rotation of the back lid 17 to the open position, most of the projection 30 slides in the slide groove 28 of the rib 25. When the open position is reached as shown in FIG. 6, a front surface of the lower end portion of the vertical portion 30b of the projection 30 is kept in contact with a back surface of the upper end portion of the rib 25 in the slide groove 28.

Figure 1:
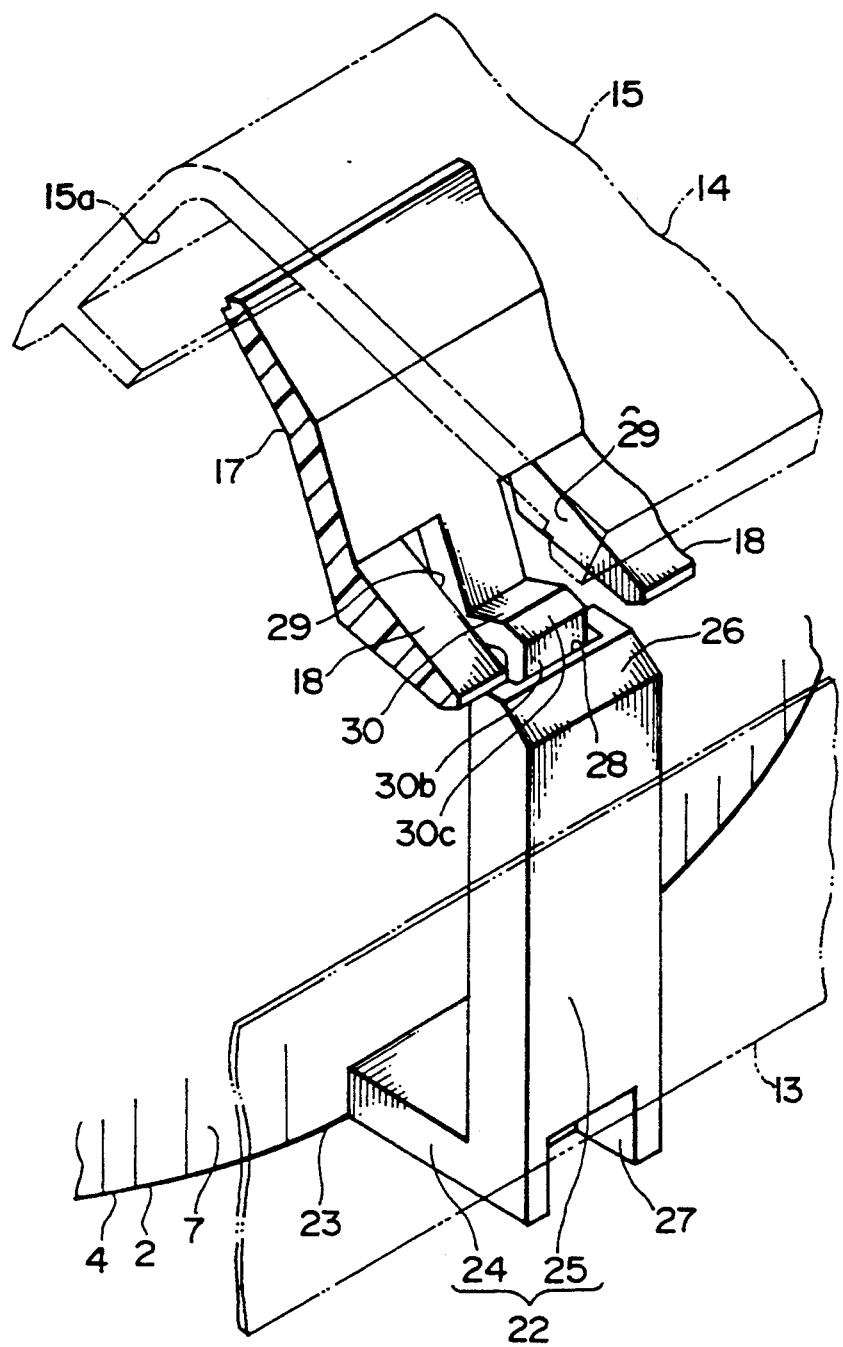
FIG. 1 is an enlarged perspective view of an essential part of a preferred embodiment of the tape cassette according to the present invention in the open position.

Accordingly, in the open position, as shown in FIGS. 1 and 6, there is no gap allowing passage of the magnetic tape 13 between the upper end of the rib 25 and the lower end of the projection 30.

As a result, even when a part of the magnetic tape 13 is lifted by the back lid 17 during the lid opening operation, the part of the magnetic tape 13 does not enter behind the rib 25, but can be returned to a normal position.

As mentioned above, and referring again to FIG. 6, the upper end surface of the rib 25 is formed so that its front end has the surface 26 that is inclined downwardly. Therefore, even when a lower edge of the magnetic tape 13 lifted by the back lid 17 rides on the upper end surface of the rib 25, the lower edge of the magnetic tape 13 slips down on the inclined surface 26 to assure its return to the normal position. The inclined surface 30c of the projection 30 has the same function as that of the inclined surface 26 of the rib 25.

Figure 9:
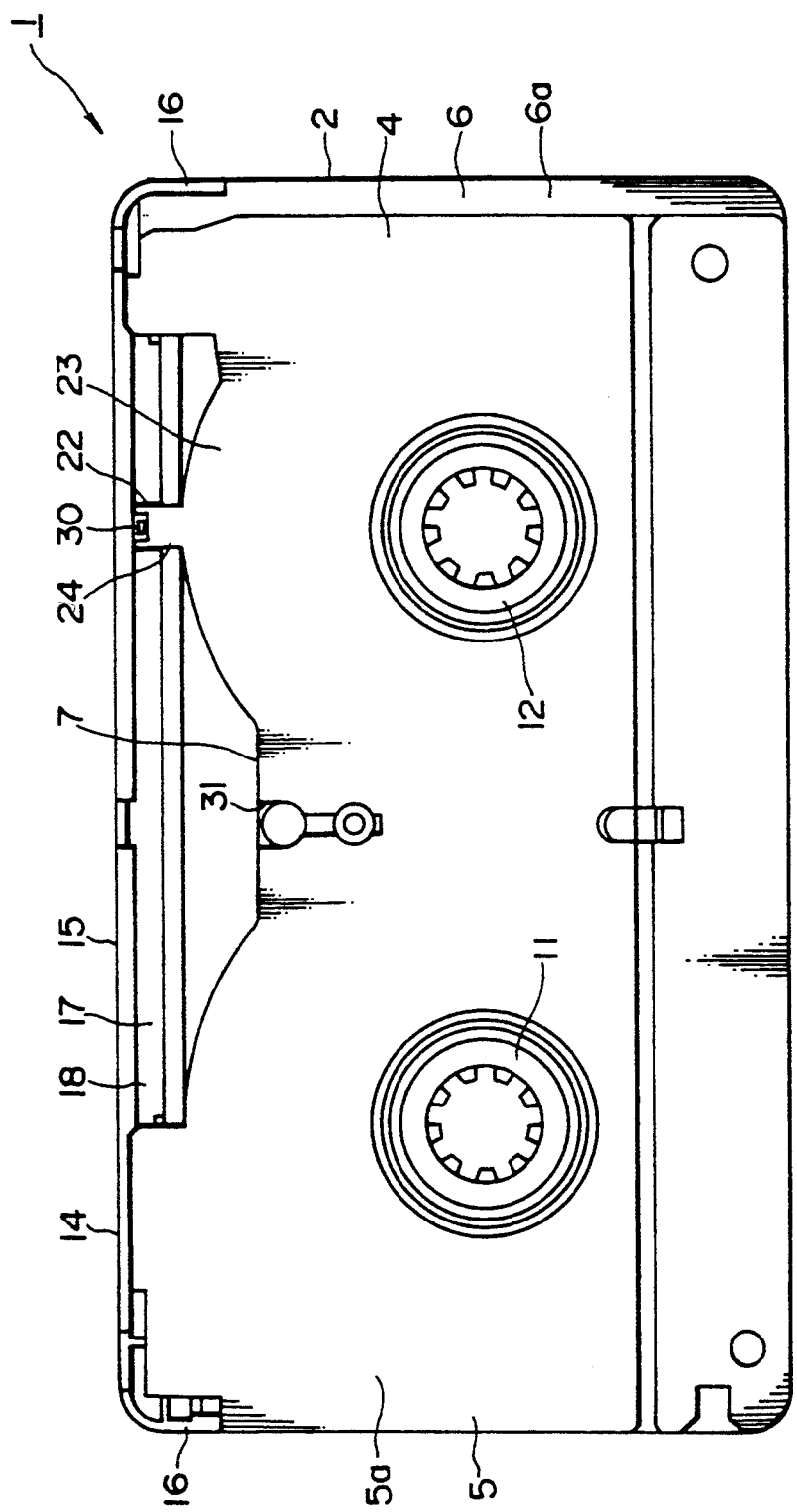
FIG. 9 is a bottom plan view of the tape cassette.

Reference numeral 31 (FIGS. 2 and 9) designates an erroneous insertion preventing groove which is formed at the center of the front end portion of the bottom wall 23 of the cassette case 2 so as to extend in the front and rear direction from the tape drawing recess 7. When the tape cassette 1 is inserted into a cassette holder 32 (FIG. 10) of a tape player, a projection 33 formed on the cassette holder 32 is inserted into the erroneous insertion preventing groove 31. Accordingly, in the event that it is attempted to insert the tape cassette 1 into the cassette holder 32 with any orientation other than the proper orientation, the projection 33 of the cassette holder 32 interferes with the tape cassette 1, thereby preventing the insertion of the tape cassette 1 with an erroneous orientation.

While the VHS tape cassette is also provided with a similar erroneous insertion preventing groove, the erroneous insertion preventing groove 31 of the tape cassette 1 in this preferred embodiment is wider than that of the VHS tape cassette, and the projection 33 of the cassette holder 32 is accordingly wider than that of a cassette holder for the VHS tape cassette. Thus, in the event that it is attempted to insert the VHS tape cassette a tape player dedicated for the HD tape cassette, the projection 33 cannot be inserted into the erroneous insertion preventing groove of the VHS tape cassette, thereby preventing erroneous insertion of the VHS tape cassette in the HD tape player.

While the preferred embodiment of the present invention is applied in a HD tape cassette having an external form like that of the VHS tape cassette, it is to be noted that the scope of the present invention is not limited to the preferred embodiment.

Further, it is to be also noted that the form and the structure mentioned in the preferred embodiment are merely illustrative and the scope of the present invention is not to be construed as limited to the preferred embodiment.

What is claimed is:

1. A tape cassette having a housing of generally rectangular configuration containing reels on which a tape is wound and having top and bottom walls and a peripheral wall extending between the top and bottom walls along three sides of the housing so as to form an opening along the fourth side of the housing, the top and bottom walls respectively having first and second cutouts communicating with the opening and extending along a portion of said fourth side of the housing, the tape being guided between the reels in a path having a run extending along the opening, a front lid mounted on the housing and being movable relative thereto between a closed position covering the opening and an open position exposing the opening, and a back lid movable together with the front lid between the closed position in which the back lid is positioned behind the front lid and the open position in which the back lid is away from the back side of the tape; said tape cassette comprising a rib positioned in said opening for providing support to said tape in a direction towards said front lid, said rib extending from said bottom wall towards said top wall and positioned on a side of said tape opposite said front lid, and a projection formed on an edge of said back lid for engaging an end of said rib when said front lid is in said open position whereby movement of an edge of said tape into a position between said rib and said back lid is prevented by said projection.

2. The tape cassette as defined in claim 1, wherein said rib has a back surface in which is formed a slide groove extending to said end of said rib, said projection sliding in said slide groove of said rib as said front lid moves from said closed position to said open position.

3. The tape cassette as defined in claim 2, wherein said rib has an upper front end with a downwardly and forwardly inclined surface.

4. The tape cassette as defined in claim 2, wherein said projection has an upper front end with a downwardly and forwardly inclined surface.

5. The tape cassette as defined in claim 4, wherein said projection has a tip with a hook-shaped portion.

6. The tape cassette as defined in claim 5, wherein said rib has a base portion with an opening for accommodating said hook-shaped portion when said front lid is in the closed position.

7. The tape cassette as defined in claim 1, wherein said rib has an upper front end with a downwardly and forwardly inclined surface.

8. The tape cassette as defined in claim 1, wherein said projection has an upper front end with a downwardly and forwardly inclined surface.

9. The tape cassette as defined in claim 8, wherein said projection has a tip with a hook-shaped portion.

10. The tape cassette as defined in claim 9, wherein said rib has a base portion with an opening for accommodating said hook-shaped portion when said front lid is in the closed position.

* * * * *